United States Patent [19]

Su

[11] Patent Number: 5,462,782
[45] Date of Patent: Oct. 31, 1995

[54] ADHESIVE PLATE ASSEMBLY FOR SHEET OBJECT

[76] Inventor: Ching-Fang Su, No. 184 Fengren Rd., Fengsan, Kaushiong, Taiwan

[21] Appl. No.: 7,478

[22] Filed: Jan. 22, 1993

[51] Int. Cl.⁶ .................... A47F 7/14; A47G 1/17; B32B 27/00
[52] U.S. Cl. .................... 428/40; 248/205.3; 248/205.4; 428/187; 428/195; 428/202; 428/212; 428/217; 428/354; 428/355; 428/518; 428/520; 428/522
[58] Field of Search .................... 428/40, 195, 202, 428/217, 212, 354, 355, 518, 520, 522, 187, 442; 248/467, 205.3, 205.4

[56] References Cited

U.S. PATENT DOCUMENTS

| | | | |
|---|---|---|---|
| 3,885,768 | 5/1975 | Frye | 428/40 |
| 4,310,137 | 1/1982 | Frye | 428/40 |
| 4,756,498 | 7/1988 | Frye | 248/467 |
| 4,804,584 | 2/1989 | Nakashima | 428/518 |
| 5,100,709 | 3/1992 | Barger | 428/518 |
| 5,121,896 | 6/1992 | Frye | 248/467 |

FOREIGN PATENT DOCUMENTS 1186747  2/1970  United Kingdom ............ 428/518

*Primary Examiner*—Nasser Ahmad
*Attorney, Agent, or Firm*—Laff, Whitesel, Conte & Saret, Ltd.

[57] ABSTRACT

An adhesive plate assembly for a sheet object, such as a photograph, advertisement, or the like, has an adhesive layer made of a hard polyvinyl chloride or polyethylene. The upper surface of the adhesive layer has an adhesive coating. A protection layer is removably adhered to the upper surface of the adhesive layer for protecting the adhesive coating from contamination. The sheet object is suitable to be adhered to the adhesive layer by the adhesive coating after the protection layer is removed. A soft layer is connected to the bottom surface of the adhesive layer, and is made of a soft polyvinyl chloride and adapted to be attached directly to and removed from a glazy surface repeatedly.

4 Claims, 1 Drawing Sheet

ADHESIVE PLATE ASSEMBLY FOR SHEET OBJECT

BACKGROUND OF THE INVENTION

The present invention relates generally to an adhesive plate assembly to which a sheet object, such as a propaganda, advertisement or photograph, can be adhered, and more particularly to one which can be attached to and removed from any glazy surface easily and repeatedly.

In general, a sheet object, such as a photograph, public notice, advertisement, or propaganda, is adhered directly to a wall surface, glass surface, or the like by the adhesive tape, glue, or paste. In this conventional manner, the adhered sheet object is frequently uneven, and the excessive glue or paste will be exposed along the periphery of the sheet object, affecting the aesthetic appearance of the sheet object. After the sheet object is removed, some part of the sheet object and/or some glue or paste may be remained on the wall surface or glass surface. It is usually very time-consuming and laborious to clean them. In addition, the removed sheet object cannot be used again.

SUMMARY OF THE INVENTION

The primary object of the present invention is to provide an adhesive plate assembly for a sheet object which can overcome the above-mentioned drawbacks. The sheet object can be adhered flatly to the adhesive plate assembly without a back glue. Further, the adhesive plate assembly can be also flatly and removably attached to any glazy surface without an adhesive. After the adhesive plate assembly is removed from the glazy surface, the glazy surface will not be contaminated, and the adhesive plate assembly can be reused. In accordance with the present invention, an adhesive plate assembly for a sheet object comprises an adhesive layer made of one material selected from a hard polyvinyl chloride and a polyethylene with one surface of the adhesive layer having an adhesive coating; a protection layer removably adhered to the one surface of the adhesive layer for protecting the adhesive coating from contamination so that the sheet object is always suitable to be adhered to the adhesive layer by the adhesive coating after the protection layer is removed; and a soft layer connected to the other surface of the adhesive layer, and made of a soft polyvinyl chloride adapted to be attached directly to and removed from a glazy surface repeatedly.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
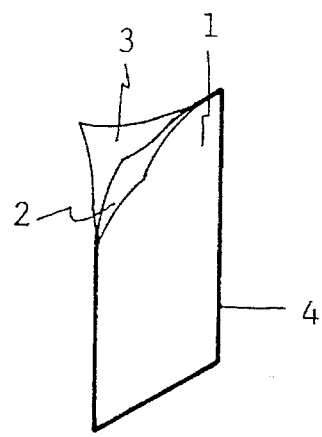
FIG. 1 is a perspective view of an adhesive plate assembly in accordance with one preferred embodiment of the present invention.
Figure 2:
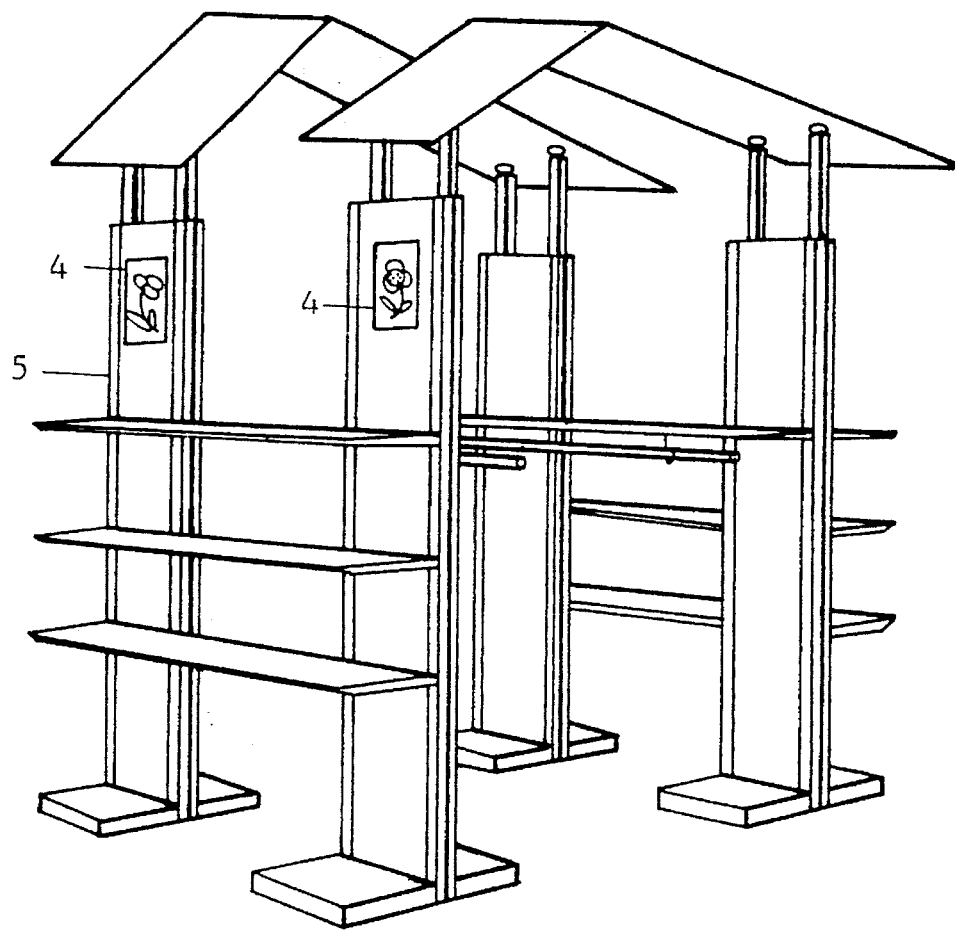
FIG. 2 is a perspective view of a display shelf with two adhesive plate assemblies of the present invention attached thereon.

Referring now to FIG. 1, an adhesive plate assembly 4 of the present invention comprises a protection layer 1, an adhesive layer 2, and a soft layer 3. The adhesive layer 2 may be made of a hard polyvinyl chloride (PVC) or a polyethylene (PE). The soft layer 3 may be made of a soft polyvinyl chloride. The bottom surface of the adhesive layer 2 is connected to the soft layer 3 by an adhesive or the like, and the adhesive and soft layers 2 and 3 are rolled together by a rolling machine to form a combined piece. The upper surface of the adhesive layer 2 is further coated with an adhesive, such as a self-posting adhesive or strong adhesive. The protection layer 1 is removably adhered to the upper surface of the adhesive layer 2 to protect the adhesive coating from contamination. When the adhesive plate assembly 4 is to be used, the protection layer 1 is removed off to expose the adhesive coating on the upper surface of the adhesive layer 2. A sheet object, such as a photograph, advertising sheet, propaganda, or the like, can be then adhered to the upper surface of the adhesive layer 2 flatly and easily. The soft polyvinyl chloride material has characteristics that it can be firmly attached to any glazy surface, such as a glass surface, varnished surface, or the like, by itself without any adhesive, and that it can be simply removed from the glazy surface without contaminating the surface, and can be used repeatedly. Therefore, the adhesive plate assembly 4 can utilize the soft layer 3 to have itself attached on a glazy surface, and thus displays the sheet object which is adhered to the adhesive layer 2. In FIG. 2, two adhesive plate assemblies 4 of the present invention are attached to a display shelf 5, and two sheet objects with flower drawings are adhered to the adhesive plate assemblies 4 respectively. Furthermore, the adhesive plate assembly 4 can be removed from the glazy surface easily if it is no longer needed. Since the protection layer 1 will be removed off when the adhesive plate assembly 4 is to be used, the protection layer 1 may be made of any kind of materials that it can be adhered to the adhesive layer 2, and can be also removed off from the adhesive layer 2 easily. For example, the separating paper and plastics are suitable to form the protection layer 1. Of course, the protection layer 1 may be made of a material of higher quality, and a display information, such as a delicate drawing and/or description can be printed directly thereon for the decorating or advertising purpose.

As mentioned above, the adhesive coating on the upper surface of the adhesive layer 2 may be a strong adhesive or self-posting adhesive. The term "self-posting adhesive" refers to the adhesive which is the same as or similar to the adhesive used in the "Post-It (Trademark of 3M Co.) Note Pad". In the case of self-posting adhesive, the adhered sheet object can be removed off easily without damage, and another sheet object may be adhered to the adhesive plate assembly 4 for another purpose. Thus, if the sheet object is worthy of preservation, or the adhesive plate assembly is desired to have its adhered sheet object changed sometimes or even frequently, the self-posting adhesive is preferable. In the case of strong adhesive, the sheet object can be adhered to the adhesive plate assembly 4 more firmly than the former case. However, the sheet object cannot be removed or changed in the latter case. The adhesive layer 2 of the hard polyvinyl chloride or polyethylene material has the advantages of low cost, light weight, and good elasticity. The adhesive layer 2 can be formed of a thin and flat plate so that the sheet object can be adhered thereon flatly and easily.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A flat adhesive plate assembly for a mounting sheet object which is directly displayed by said adhesive plate assembly and removably adhered only to a glazy surface, said plate assembly consisting of:

a hard polyethylene layer comprising one surface and another surface, having a releasable pressure adhesive and coating on one surface thereof;

a release paper protection layer removably adhered to said one surface of said polyethylene layer for protecting said pressure adhesive coating from contamination so that after said protection layer is removed, said sheet object is adhered to said polyethylene layer responsive to pressing said adhesive coating directly against said sheet object;

a soft polyvinyl chloride layer attached to said polyethylene layer and repeated removable from and reattachable directly to said glazy surface; and an adhesive disposed between said polyvinyl chloride layer and the other surface of said polyethylene layer for adhering together said polyethylene layer and said polyvinyl chloride layer.

2. An adhesive plate assembly for a sheet object as claimed in claim 1, wherein said sheet object is an advertising sheet.

3. An adhesive plate assembly for a sheet object as claimed in claim 1, wherein said sheet object is a photograph.

4. An adhesive plate assembly for a sheet object as claimed in claim 1, wherein said protection layer is printed with a display information.

* * * * *